P. BESTA.
RAILWAY BRAKING DEVICE.
APPLICATION FILED JULY 3, 1911.
1,047,154.
Patented Dec. 17, 1912.
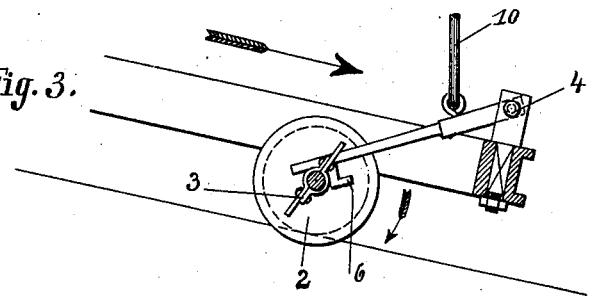
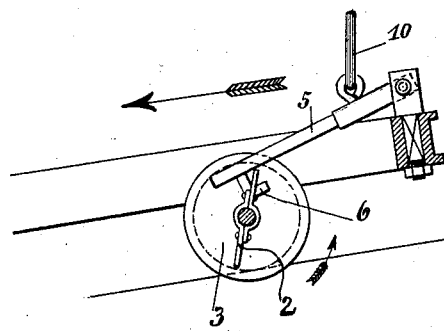
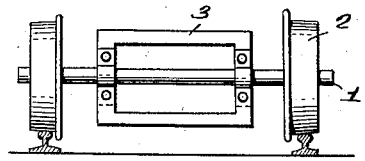
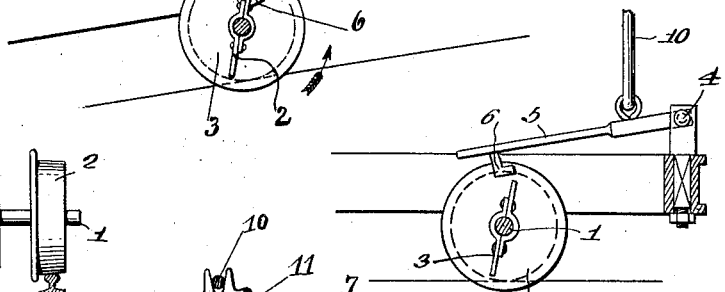
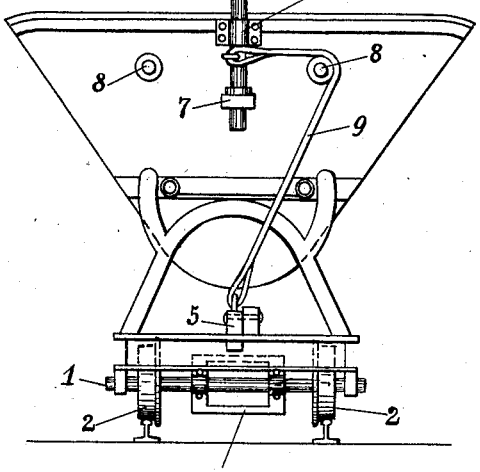
Witnesses:
Inventor:

UNITED STATES PATENT OFFICE.

PAUL BESTA, OF RATINGEN, GERMANY.

RAILWAY BRAKING DEVICE.

1,047,154.  Specification of Letters Patent.  Patented Dec. 17, 1912.

Application filed July 3, 1911. Serial No. 636,769.

*To all whom it may concern:*

Be it known that I, PAUL BESTA, a subject of the King of Prussia, residing at Ratingen, in the Kingdom of Prussia, Germany, have invented certain new and useful Improvements in Railway Braking Devices, of which the following is a specification.

This invention relates to a braking device for cars running on tracks, hauled by ropes or chains, said braking device beginning to operate as soon as the vehicle is no longer drawn along by the rope or by the chain.

According to this invention the braking device consists of a frame-shaped yoke fixed upon the wheel axle, a brake lever catching between said yoke and the axle as soon as the car begins to run back. The lever thus locks the wheels and consequently stops the car.

For preventing a forward running of the vehicle on hilly ground the brake lever has a downwardly projecting hook which grips the yoke. When the car is being hauled the brake lever is lifted off the yoke to be automatically released as soon as the driving rope or chain loses connection with the car.

If the car has to be secured only against running back the brake lever is used without a hook.

In the accompanying drawings the improved device is shown.

Figure 1 shows the wheels with the brake yoke in elevation. Fig. 2 is a side view representing a brake lever for braking in either direction and in inoperative position. Fig. 3 shows the braking device in operative position when the car is running back. Fig. 4 shows the same device in operation with a car running accidentally forward. Fig. 5 shows the device for lifting the brake lever off the yoke and for automatically releasing said lever.

The braking device consists of an arresting yoke 3 attached to the axle 1 of the wheels 2 and upon which rests the free end of a lever 5 pivoted at 4, to the frame of the car. When the car runs back the lever catches between the yoke and the axle thus locking the wheels of the car. The yoke 3 is large enough so that it cannot be clogged by dirt, stones or the like.

A car may be used on hilly ground so that it must be secured against rolling forward as well as against rolling backward. The braking lever 5 has a hook 6 at its free end adapted to grip the yoke 3 as soon as the car begins accidentally to run forward, said car being thus instantaneously braked (Fig. 4). This braking lever has to be lifted off the yoke 3 when the car is attached to the driving rope. This lifting off is effected by a fork in the manner illustrated in Fig. 5.

The fork 11 guided on the rope 10 is mounted at the rear of the car in bearings 7 so that it can freely turn in said bearings. To this fork 11 a pull cable 9, guided over a pulley 8, is attached, its other end being connected with the braking lever 5. The weight of this lever exerts a pull on the cable 9 which tends to turn the fork 11 in its bearings against the action of the driving rope 10. The length of the cable 9 is calculated so that the brake lever 5 is lifted off the yoke 3 as soon as the driving rope 10 acts upon the fork 11 (Fig. 2). When the driving rope breaks or jumps out of the fork 11 so that the latter is released the brake lever 5 returns to its operative position and begins to act (Figs. 3–4).

The connection between the driving rope and the lever can be established by other suitable and convenient means, the connection (Fig. 5) being shown only by way of example.

I claim:—

1. A braking device for cars hauled by ropes, comprising in combination a frame shaped yoke keyed upon the wheel axle, a brake lever pivoted with one end to the frame of the car and bearing with the other end upon said yoke, a hook at the free end of said lever designed to grip the yoke when the car is accidentally running forward and means for lifting said lever off said yoke as long as the car is pulled by the driving rope, substantially as described and shown and for the purpose set forth.

2. A braking device for cars hauled by ropes, comprising in combination a frame shaped yoke attached to the wheel axle, a brake lever pivoted with one end to the frame of the car and bearing with the other end upon said yoke, a hook at the free end of said lever designed to grip the yoke when the car is accidentally running forward and means for lifting said lever off said yoke as long as the car is pulled by the driving rope, said means consisting of a fork mounted at the rear of the car so that it can freely turn in its bearings, said fork gripping the driving rope, a pull cable attached with one end to said fork and with the other end to said brake lever, and a pulley over which said cable is guided, substantially as described and shown and for the purpose set forth.

In witness whereof I have hereunto set my hand in the presence of two witnesses.

PAUL BESTA. [L. S.]

Witnesses:
CHAS. J. WRIGHT,
ALBERT F. NUFER.

Copies of this patent may be obtained for five cents each, by addressing the "Commissioner of Patents, Washington, D. C."